US009249665B2

(12) United States Patent
Dimmick, III et al.

(10) Patent No.: US 9,249,665 B2
(45) Date of Patent: Feb. 2, 2016

(54) TURBINE APERTURE CAP SYSTEM

(75) Inventors: John Herbert Dimmick, III, Greenville, SC (US); Bruce Carlisle McClintick, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 753 days.

(21) Appl. No.: 13/585,459

(22) Filed: Aug. 14, 2012

(65) Prior Publication Data

US 2014/0050577 A1    Feb. 20, 2014

(51) Int. Cl.
| | |
|---|---|
| *F01D 25/00* | (2006.01) |
| *F01D 5/06* | (2006.01) |
| *F16B 21/18* | (2006.01) |

(52) U.S. Cl.
CPC ............... *F01D 5/066* (2013.01); *F16B 21/186* (2013.01); *Y02E 20/16* (2013.01)

(58) Field of Classification Search
CPC ..... F01D 5/066; F01D 25/00; F05D 2260/31; F05D 2260/97; F05D 2260/972
See application file for complete search history.

(56) References Cited

U.S. PATENT DOCUMENTS

| | | | |
|---|---|---|---|
| 5,996,352 A | 12/1999 | Coughlan et al. | |
| 6,784,597 B1 * | 8/2004 | Hess et al. | 310/320 |
| 7,942,635 B1 | 5/2011 | Murray | |
| 2011/0079020 A1 | 4/2011 | Durocher et al. | |
| 2012/0151937 A1 * | 6/2012 | Muscat et al. | 60/805 |

* cited by examiner

*Primary Examiner* — Craig Kim
*Assistant Examiner* — Jason Davis
(74) *Attorney, Agent, or Firm* — Ernest G. Cusick; Hoffman Warnick LLC (57) ABSTRACT

Systems and devices adapted to reduce disturbances and windage effects in a turbine during operation are disclosed. In one embodiment, a cap includes: a body portion having a shape complementary to an aperture in a turbine component, the body portion including an external surface which substantially covers the aperture; and a cap groove formed in a circumferential surface of the body portion, the cap groove configured to substantially align with a component groove formed in the aperture.

18 Claims, 10 Drawing Sheets

TURBINE APERTURE CAP SYSTEM

BACKGROUND OF THE INVENTION

The subject matter disclosed herein relates to turbines and, more particularly, to systems and devices for reducing disturbances and windage effects in a turbine.

Some power plant systems, for example certain nuclear, simple cycle and combined cycle power plant systems, employ turbines in their design and operation. Some of these turbines (e.g., steam turbines, gas turbines, etc.) include components which are exposed to a flow of working fluid during operation. As the working fluid flows through the turbine, features and/or interrupted surfaces on some components (e.g., apertures, counterbores, etc.) disrupt the working fluid creating drag and noise (i.e., windage effects) which reduce turbine efficiency and may increase the operating temperature of surrounding components. Some systems use jam nuts to fill counterbores which streamline component surfaces and thus reduce the effect these features have on the working fluid flow. During installation, bolts with extra threading are installed in counterbore holes of the turbine, this extra threading is machined to connect to and retain a complementary jam nut within the counterbore hole. Once the bolt is installed, the jam nut is threaded onto the end of the bolt via the extra threading such that the jam nut fills the counterbore opening, thereby reducing disturbances, heat-up, and power losses associated with the counterbore. However, these jam nuts may complicate turbine maintenance, require additional tooling, apply extra weight and stress to the bolts during operation, and must be anti-rotated, often by semi-permanent methods (staking).

BRIEF DESCRIPTION OF THE INVENTION

Systems and devices adapted to reduce disturbances and windage effects in a turbine during operation are disclosed. In one embodiment, a cap includes: a body portion having a shape complementary to an aperture in a turbine component, the body portion including an external surface which substantially covers the aperture; and a cap groove formed in a circumferential surface of the body portion, the cap groove configured to substantially align with a component groove formed in the aperture.

A first aspect of the disclosure provides a cap including: a body portion having a shape complementary to an aperture in a turbine component, the body portion including an external surface which substantially covers the aperture; and a cap groove formed in a circumferential surface of the body portion, the cap groove configured to substantially align with a component groove formed in the aperture.

A second aspect provides a turbine including: a stator; a working fluid passage substantially surrounded by the stator; a turbine component configured radially inboard of the stator and having a flow surface contacted by the working fluid passage, the flow surface defining an aperture; and a cap disposed within the aperture, the cap including: a body portion having a shape complementary to the aperture in the turbine component, the body portion including an external surface which substantially covers the aperture; and a cap groove formed in a circumferential surface of the body portion, the cap groove configured to substantially align with a component groove formed in the aperture.

A third aspect provides a system including: a cap including: a body portion having a shape complementary to an aperture in a turbine component, the body portion including an external surface which substantially covers the aperture; and a cap groove formed in a circumferential surface of the body portion, the cap groove configured to substantially align with a component groove formed in the aperture; and a ring disposed substantially about the body portion and extending into the cap groove.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the disclosure are not necessarily to scale. The drawings are intended to depict only typical aspects of the disclosure, and therefore should not be considered as limiting the scope of the disclosure. It is understood that elements similarly numbered between the FIGURES may be substantially similar as described with reference to one another. Further, in embodiments shown and described with reference to FIGS. 1-11, like numbering may represent like elements. Redundant explanation of these elements has been omitted for clarity. Finally, it is understood that the components of FIGS. 1-11 and their accompanying descriptions may be applied to any embodiment described herein.

DETAILED DESCRIPTION OF THE INVENTION

As indicated herein, aspects of the invention provide for systems and devices adapted to reduce disturbances and windage effects in a turbine during operation. The caps of these systems are installed in apertures within the turbine at a position which is substantially planar relative a flow surface of turbine components, thereby covering the aperture and forming a substantially regular flow surface.

In the art of power generation systems (including, e.g., nuclear reactors, steam turbines, gas turbines, etc.), turbines driven by high temperature fluids (e.g., gas, steam, etc.) are often employed as part of the system. Some turbines include components with interrupted surfaces such as apertures and counterbores which are exposed to the working fluid flow and may cause disturbances, power loss, fluid heating, or other undesirable windage effects in the turbine. These disturbances and windage effects may reduce turbine efficiency and form thermal gradients within the turbine which may damage turbine components.

Embodiments of the current invention provide for systems and devices adapted to reduce disturbances and windage effects in turbines by using a cap to substantially cover and/or seal apertures in turbine components. The cap covers the aperture, forming a planar surface relative a flow surface of the component and shielding the working fluid flow from contacting irregular surfaces of and/or within the aperture. The cap is retained within the aperture via a ring which extends into a cap groove in the cap and a component groove formed in a surface of the turbine component which defines the aperture, thereby forming a more regular flowpath surface for the working fluid. During operation, the cap reduces windage losses in the working fluid flow which prevents the formation of unneccesary heat-up of the working fluid and turbine components in contact with the working fluid.

Turning to the FIGURES, embodiments of systems and devices including a cap are shown, where the cap may impact efficiency and increase the life expectancy of the turbine and the overall power generation system by reducing windage effects. Each of the components in the FIGURES may be connected via conventional means, e.g., via a common conduit or other known means as is indicated in FIGS. 1-11. Specifically, referring to FIG. 1, a three-dimensional perspective view of a portion of a turbine 100 including an aperture 110 is shown according to embodiments of the invention. Aperture 110 may be formed in a flow surface 102 of turbine 100 and may include a counterbore 106 formed to receive a bolt, nut, or like fixture. Counterbore 106 of aperture 110 may define a component groove 112 designed to connect with a cap system 118 (shown in FIG. 2). Turbine 100 may include an offset feature 98 (e.g., a cut-out, a circular cut-out, a compartment, a notch, etc.) (shown in phantom) formed in flow surface 102 and configured to accommodate a feature of cap system 118 (e.g., a tab 198).

Figure 1:
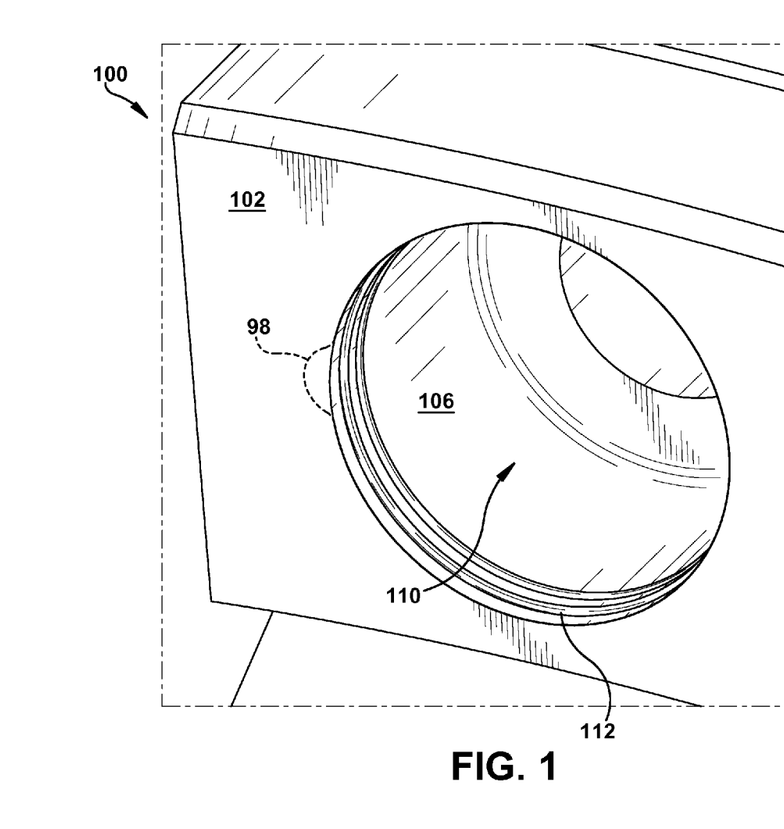
FIG. 1 shows a three-dimensional perspective view of a portion of a turbine according to an embodiment of the invention.
Figure 2:
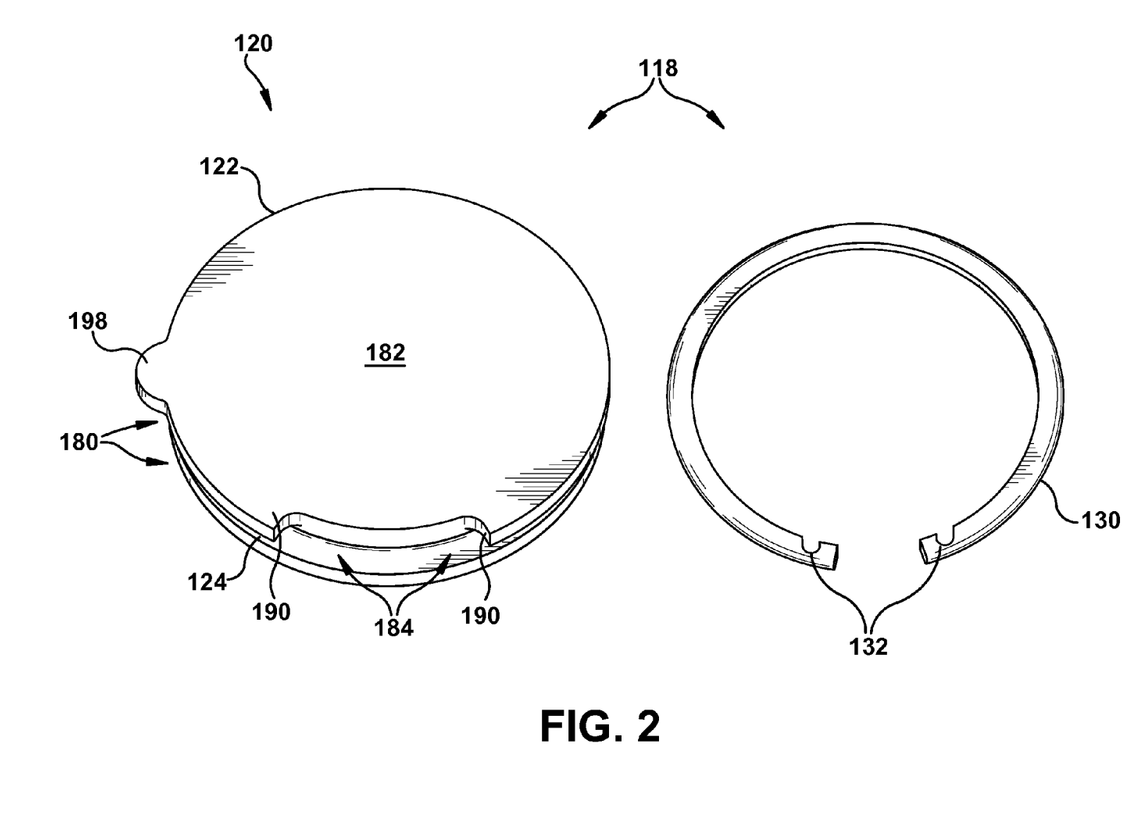
FIG. 2 shows a three-dimensional perspective exploded view of a portion of a cap system according to an embodiment of the invention.

Turning to FIG. 2, a three-dimensional perspective exploded view of cap system 118 including a cap 120 and a ring 130 is shown according to embodiments of the invention. Cap 120 may include a body portion 122 with an external surface 182 and a circumferential surface 180 which defines a cap groove 124 formed to complement ring 130. Cap groove 124 may be formed in circumferential surface 180 and offset from external surface 182, extending circumferentially about a perimeter of body portion 122. In one embodiment, cap groove 124 may be configured to substantially align with component groove 112 (shown in FIG. 1) of turbine 100, thereby positioning external surface 182 substantially flush relative to flow surface 102 (shown in FIG. 1) of turbine 100. In another embodiment, cap groove 124 may define a set of threads relative component groove 112, thereby enabling cap 120 to be screwed into turbine 100. In one embodiment, cap 120 may include a tab 198 formed to complement offset feature 98 (shown in phantom in FIG. 1) in turbine 100, thereby restricting rotational movement of cap 120 and/or cap system 118. Tab 198 may mate with offset feature 98 to form an anti-rotation feature. Cap 120 may be substantially circular and may define a notch 184 in external surface 182 which receives a set of flanges 132 on snap ring 130. Set of flanges 132 may connect to a set of surfaces 190 of notch 124, thereby connecting snap ring 130 to cap 120 and substantially reducing rotation of snap ring 130 about cap 120.

Figure 3:
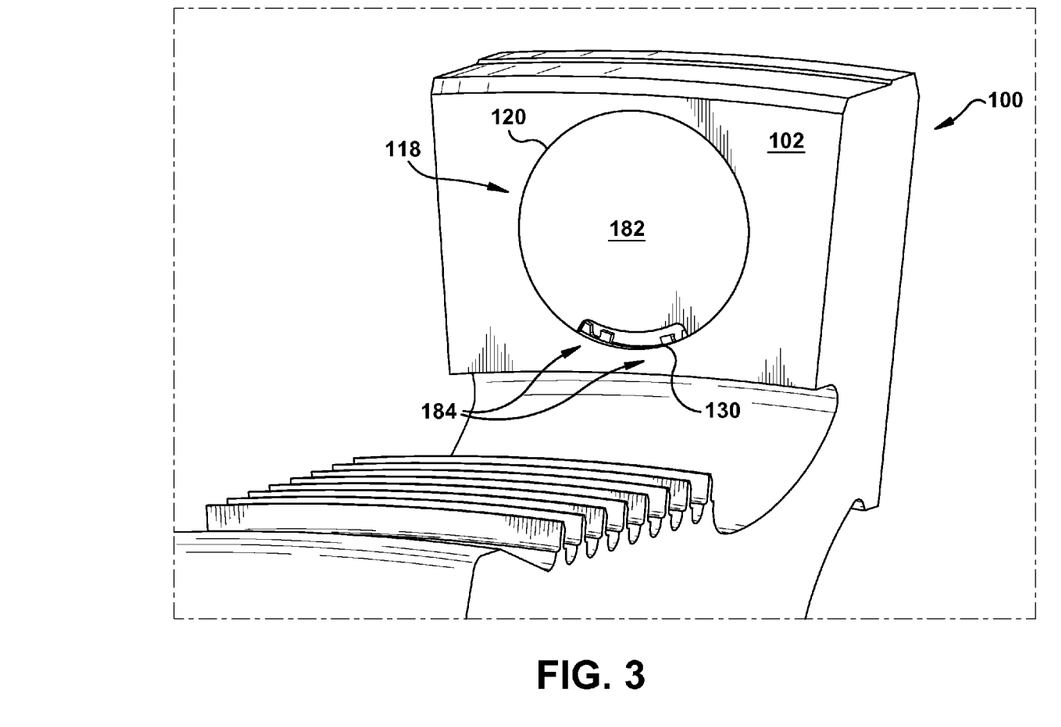
FIG. 3 shows a three-dimensional perspective view of a portion of a turbine according to an embodiment of the invention.

Turning to FIG. 3, a three-dimensional perspective view of a portion of turbine 100 including cap system 118 disposed within aperture 110 is shown according to embodiments of the invention. In this embodiment, cap system 118 may include cap 120 and ring 130 which extends circumferentially about cap 120. At least one of cap groove 124 (shown in FIG. 2) and component groove 112 (shown in FIG. 1) may slidingly receive ring 130, thereby securing a position of cap 120 in aperture 110. In one embodiment, ring 130 may extend into cap groove 124 (shown in FIG. 2) and component groove 112 (shown in FIG. 1), thereby retaining cap 120 in aperture 110 and positioning external surface 182 substantially planar relative to flow surface 102. Cap 120 may be restricted from circumferential rotation within aperture 110. In one embodiment, component groove 112 may have a varying thickness to reduce rotational movement of cap system 118. Notch 184 may expose set of flanges 132 on ring 130, thereby enabling installation and removal of cap 120 and ring 130 via manipulation of a position of set of flanges 132 and/or shape of ring 130. Set of flanges 132 may contact set of surfaces 190 in notch 184, restraining rotational movement of cap system 118. In one embodiment, set of flanges 132 may be oriented out of plane with cap groove 124, contacting cap 120 on set of surfaces 190 and restricting circumferential motion of ring 130 about cap 120.

Figure 4:
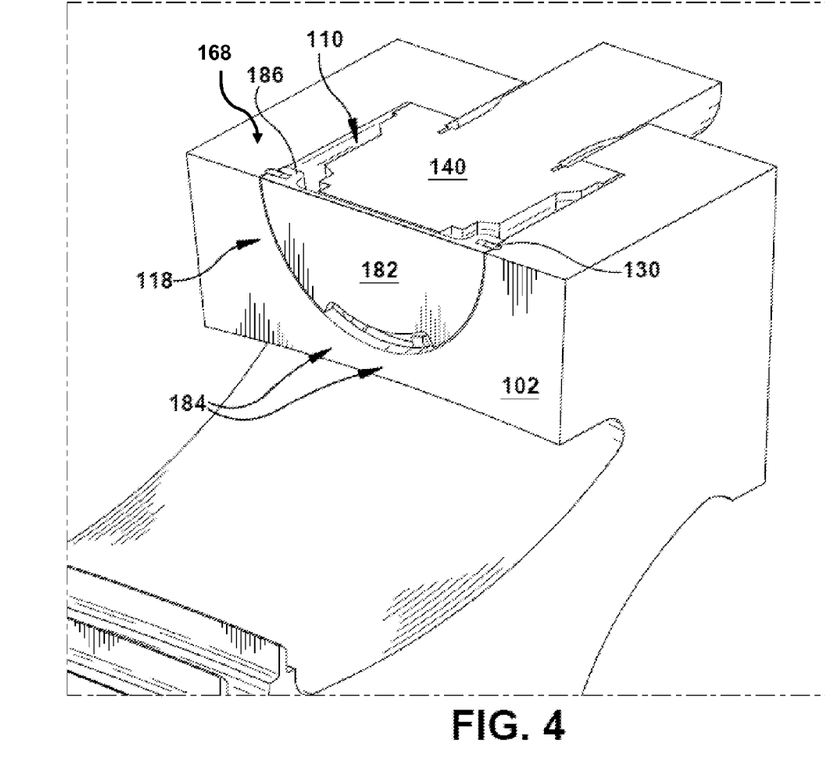
FIG. 4 shows a three-dimensional perspective view of a portion of a turbine according to an embodiment of the invention.

Turning to FIG. 4, a schematic cut-away three-dimensional perspective view of a portion of turbine 100 is shown with a cap system 168 disposed in aperture 110 over a bolt 140 according to embodiments. In this embodiment, a cap 182 includes a substantially continuous circumferential ridge 186 which extends about body portion 122 (shown in FIG. 2). Circumferential ridge 186 may partially define cap groove 124 (shown in FIG. 2) and encompass bolt 140.

Figure 5:
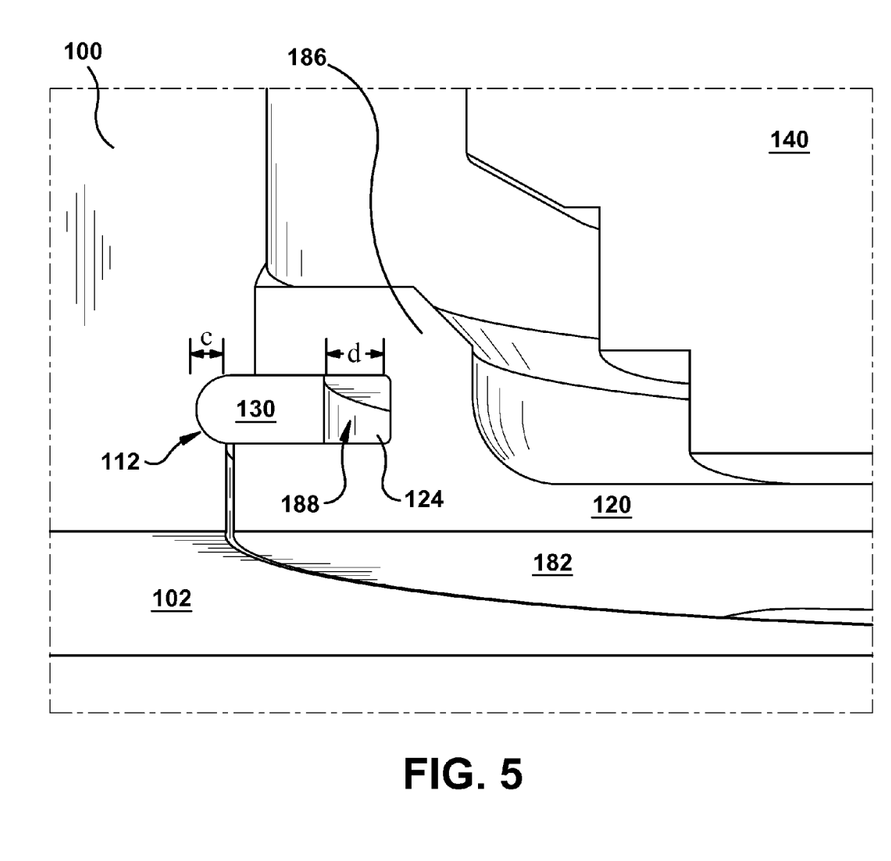
FIG. 5 shows a three-dimensional perspective view of a portion of a turbine according to an embodiment of the invention.

Turning to FIG. 5, a three-dimensional perspective view of a portion of turbine 100 is shown including ring 130 disposed in cap groove 124 and component groove 112 according to embodiments of the invention. In this embodiment, ring 130 extends into component groove 112 and into a portion of cap groove 124, securing cap 120 about bolt 140 and orienting external surface 182 substantially planar relative flow surface 102. In one embodiment, ring 130 may partially define a cavity 188 in cap groove 124. Cavity 188 may enable ring 130 to be compressed toward cap 120 and into cap groove 124, thereby removing ring 130 from component groove 112 and enabling removal of cap system 118 and/or ring 130 from turbine 100. Cavity 188 may have a dimension 'd' substantially equivalent to a depth 'c' of component groove 112. In one embodiment, bolt 140 and cap 120 may be physically isolated relative one another (e.g., not in contact). In one embodiment, an outer portion of cap 120 may extend beyond an inner portion of aperture 110 (shown in FIG. 4) by a dimension 'o' which creates a circular offset between cap 120 and aperture 110.

Figure 6:
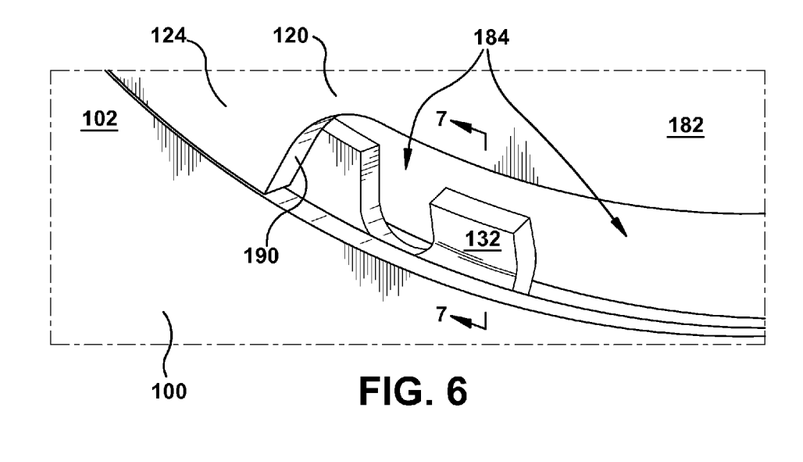
FIG. 6 shows a three-dimensional perspective view of a portion of a turbine according to an embodiment of the invention.
Figure 7:
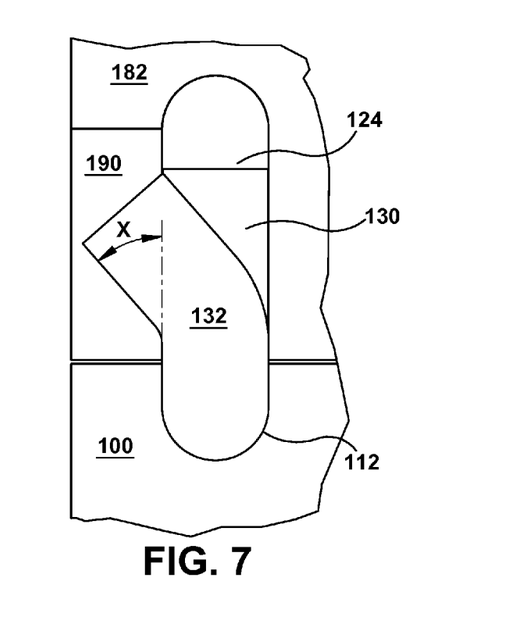
FIG. 7 shows a cross-sectional perspective view of a portion of a turbine according to an embodiment of the invention.

Turning to FIG. 6, a three-dimensional perspective view of a portion of turbine 100 is shown including ring 130 disposed in cap groove 124 (shown in phantom) according to embodiments of the invention. In this embodiment, ring 130 extends into notch 184 and into a portion of cap groove 124, securing cap 120 about bolt 140 (shown in FIG. 5) and orienting external surface 182 substantially planar relative flow surface 102. A flange 132 extends into notch 184, flange 132 may enable adjustment and/or constriction of ring 130. An operator or device may apply a force to flange 132, pressing ends together until ring 130 is within cap groove 124 for installation and removal processes. In one embodiment, as shown in FIG. 7, flange 132 may be oriented at an angle α out of plane with cap groove 124, thereby restricting rotation of ring 130 about cap groove 124. In one embodiment, displacement of flange 132 by angle α restricts circumferential movement by contacting set of surfaces 190. Flange 132 may be bent at our about a level of cap groove 124.

Figure 8:
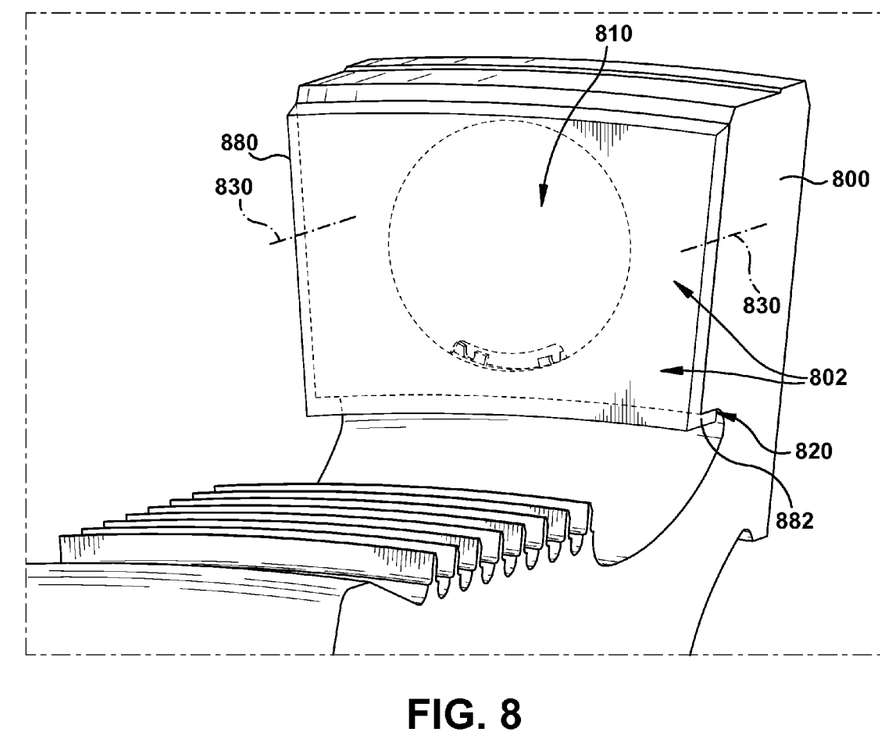
FIG. 8 shows a three-dimensional perspective view of a portion of a turbine according to an embodiment of the invention.

Turning to FIG. 8, a three-dimensional perspective view of a portion of a turbine 800 is shown including a portion of a hoop cover 880 which covers an aperture 810 and a flow surface 802 of turbine 800. In an embodiment, hoop cover 880 covers an entirety of flow surface 802 and/or cap 120. Hoop cover 880 may be axi-symmetric and may form a full hoop plate (e.g., a plate about a circumference of turbine 800) about a portion of turbine 800. In one embodiment, hoop cover 880 may include a set of counter-sunk bolts 830 (e.g., screws, shoulder bolts, pins, etc.) disposed proximate to aperture 810 and configured to connect to turbine 800 in order to restrain hoop cover 880 from axial and/or circumferential movement. Turbine 800 may include a rabbet 820 configured to slidingly receive a flange 882 of hoop cover 880, and thereby restrict radial movement of hoop cover 880. In one embodiment, hoop cover 880 may be secured in turbine 800 via a set of shoulder bolts. Hoop cover 880 may form a substantially continuous surface over flow surface 802 and/or aperture 810.

Figure 9:
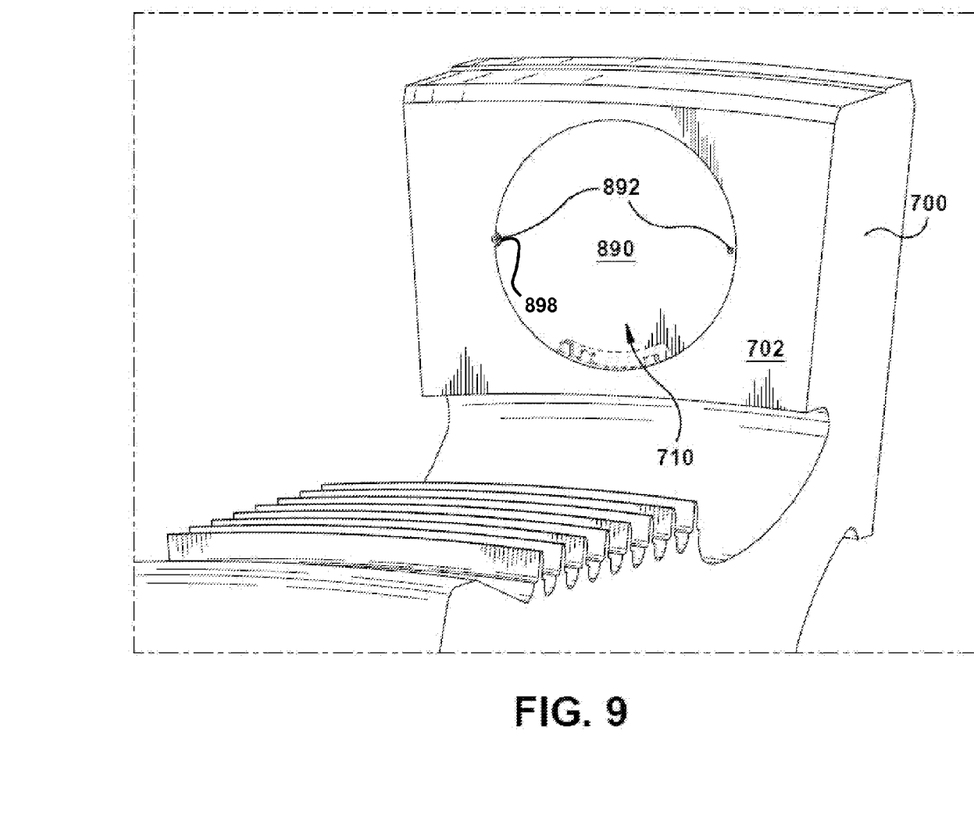
FIG. 9 shows a three-dimensional perspective view of a portion of a turbine according to an embodiment of the invention.

Turning to FIG. 9, a three-dimensional perspective view of a portion of a turbine 700 is shown including a threaded cap 890 disposed within an aperture 710 of turbine 700. In an embodiment, threaded cap 890 may be configured substantially planar relative a flow surface 702 of turbine 700. In one embodiment, threaded cap 890 may be screwed onto bolt system 140 (shown in FIGS. 4-5) via a first set of threads in threaded cap 890 configured to complement/matingly receive a second set of threads formed on bolt system 140. In one embodiment, following threading of threaded cap 890 onto bolt system 140, a set of stake portions 892 in threaded cap 890 may be staked to aperture 710 and/or bolt system 140 to keep threaded cap 890 from rotating about bolt system 140. In one embodiment, threaded cap 890 may included a recessed portion 898 configured to receive a portion of turbine 700 which may extend into aperture 710 as a result of a staking operation.

Figure 10:
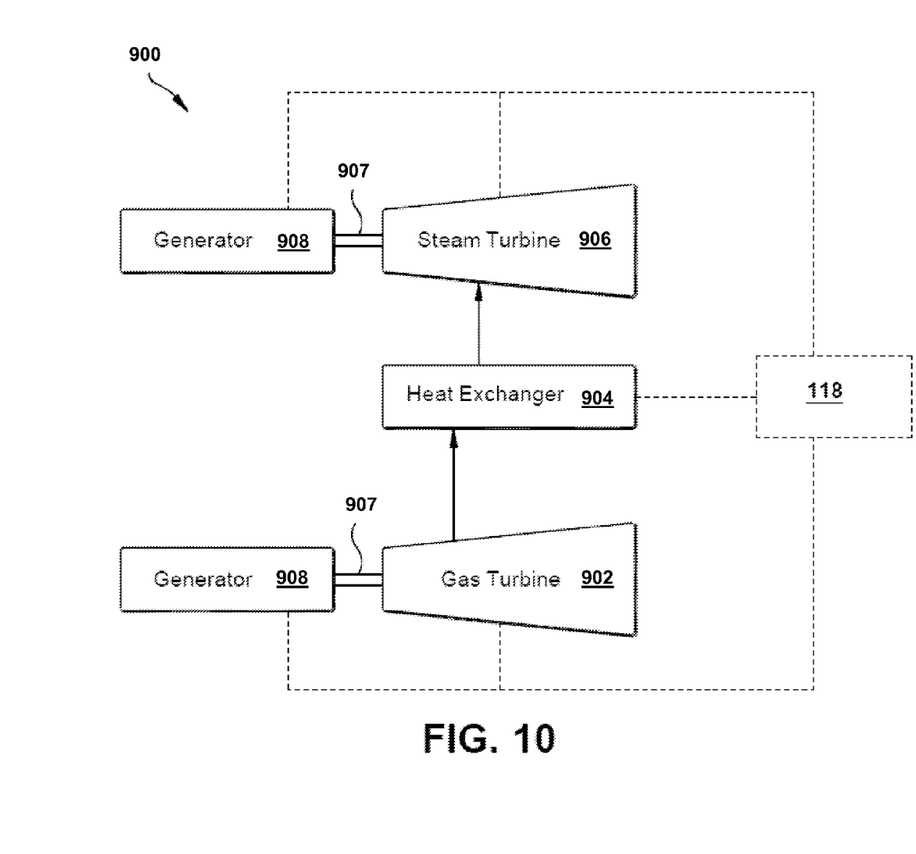
FIG. 10 shows a schematic block diagram illustrating portions of a combined cycle power plant system according to embodiments of the invention.
Figure 11:
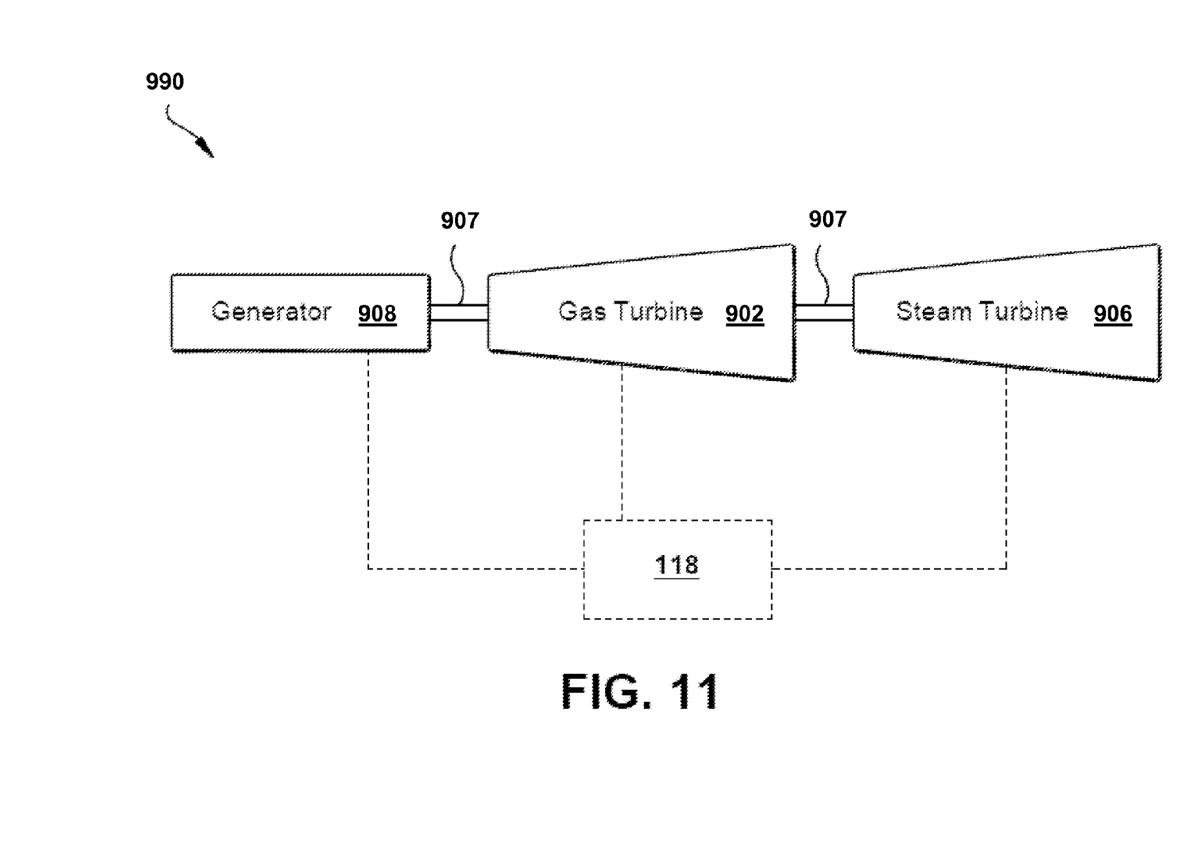
FIG. 11 shows a schematic block diagram illustrating portions of a single-shaft combined cycle power plant system according to embodiments of the invention.

Turning to FIG. 10, a schematic view of portions of a multi-shaft combined cycle power plant 900 is shown. Combined cycle power plant 900 may include, for example, a gas turbine 902 operably connected to a generator 908. Generator 908 and gas turbine 902 may be mechanically coupled by a shaft 907, which may transfer energy between a drive shaft (not shown) of gas turbine 902 and generator 908. Also shown in FIG. 10 is a heat exchanger 904 operably connected to gas turbine 902 and a steam turbine 906. Heat exchanger 904 may be fluidly connected to both gas turbine 902 and a steam turbine 906 via conventional conduits (numbering omitted). Gas turbine 902 and/or steam turbine 906 may include cap system 118 of FIG. 2 or other embodiments described herein. Heat exchanger 904 may be a conventional heat recovery steam generator (HRSG), such as those used in conventional combined cycle power systems. As is known in the art of power generation, HRSG 904 may use hot exhaust from gas turbine 902, combined with a water supply, to create steam which is fed to steam turbine 906. Steam turbine 906 may optionally be coupled to a second generator system 908 (via a second shaft 907). It is understood that generators 908 and shafts 907 may be of any size or type known in the art and may differ depending upon their application or the system to which they are connected. Common numbering of the generators and shafts is for clarity and does not necessarily suggest these generators or shafts are identical. In another embodiment, shown in FIG. 11, a single shaft combined cycle power plant 990 may include a single generator 908 coupled to both gas turbine 902 and steam turbine 906 via a single shaft 907. Steam turbine 906 and/or gas turbine 902 may include cap system 118 of FIG. 2 or other embodiments described herein.

The caps and systems of the present disclosure are not limited to any one particular turbine, power generation system or other system, and may be used with other power generation systems and/or systems (e.g., combined cycle, simple cycle, nuclear reactor, etc.). Additionally, the caps and systems of the present invention may be used with other systems not described herein that may benefit from the shielding, efficiency, ease of installation and windage effect reducing described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cap comprising:
    a body portion having a shape complementary to an aperture in a turbine component, the body portion including an external surface which substantially covers the aperture; and
    a cap groove formed in a circumferential surface of the body portion, the cap groove configured to substantially align with a component groove formed in the aperture, wherein the cap groove is further configured to position the external surface substantially flush relative the flow surface of the turbine component.

2. The cap of claim 1, wherein the cap groove extends circumferentially about a perimeter of the body portion.

3. The cap of claim 1, wherein the cap is substantially circular.

4. The cap of claim 1, wherein the external surface is substantially planar.

5. The cap of claim 1, further comprising a notch defined in the body portion through a portion of the external surface.

6. The cap of claim 1, further comprising a tab extending from the body portion, the tab configured to complement a feature of the turbine component.

7. A turbine, comprising:
a stator;
a working fluid passage substantially surrounded by the stator;
a turbine component configured radially inboard of the stator and having a flow surface contacted by the working fluid passage, the flow surface defining an aperture; and
a cap disposed within the aperture, the cap including:
  a body portion having a shape complementary to the aperture in the turbine component, the body portion including an external surface which substantially covers the aperture; and
  a cap groove formed in a circumferential surface of the body portion, the cap groove configured to substantially align with a component groove formed in the aperture.

8. The turbine of claim 7, wherein the cap groove extends circumferentially about a perimeter of the body portion.

9. The turbine of claim 7, wherein the cap groove is further configured to position the external surface substantially flush relative to the flow surface of the turbine component.

10. The turbine of claim 7, further comprising a notch defined in the body portion through a portion of the external surface.

11. The turbine of claim 7, wherein the body portion further includes a tab extending from the body portion, the tab configured to complement a feature of the turbine component.

12. The turbine of claim 7, further comprising:
a component groove formed in the aperture; and
a ring disposed substantially about the body portion and extending into the cap groove and component groove.

13. The turbine of claim 12, wherein the ring is configured to position the external surface substantially flush relative to the flow surface of the turbine component.

14. A system comprising:
a cap including:
  a body portion having a shape complementary to an aperture in a turbine component, the body portion including an external surface which substantially covers the aperture; and
  a cap groove formed in a circumferential surface of the body portion, the cap groove configured to substantially align with a component groove formed in the aperture; and
  a ring disposed substantially about the body portion in the cap groove,
  wherein the cap groove is further configured to position the external surface substantially flush relative the flow surface of the turbine component.

15. The system of claim 14, wherein the cap groove extends circumferentially about a perimeter of the body portion.

16. The system of claim 14, wherein the ring is configured to position the external surface substantially flush relative to the flow surface of the turbine component.

17. The system of claim 14, further comprising a notch defined in the body portion through a portion of the external surface.

18. The system of claim 14, wherein the external surface is substantially planar.

* * * * *